(12) United States Patent
Hofmeister

(10) Patent No.: US 9,820,435 B2
(45) Date of Patent: Nov. 21, 2017

(54) FLOATING TRIMMER ATTACHMENT FOR LAWNMOWERS

(71) Applicant: Jean Hofmeister, White Hall, MD (US)

(72) Inventor: Jean Hofmeister, White Hall, MD (US)

(*) Notice: Subject to any disclaimer, the term of this patent is extended or adjusted under 35 U.S.C. 154(b) by 0 days.

(21) Appl. No.: 14/074,975

(22) Filed: Nov. 8, 2013

(65) Prior Publication Data

US 2014/0123614 A1 May 8, 2014

Related U.S. Application Data

(60) Provisional application No. 61/723,954, filed on Nov. 8, 2012.

(51) Int. Cl.
*A01D 34/84* (2006.01)

(52) U.S. Cl.
CPC .................... *A01D 34/84* (2013.01)

(58) Field of Classification Search
CPC ........ A01D 34/00; A01D 34/84; A01D 34/63; A01D 34/64; A01D 34/76; A01D 34/86; A01D 34/866; A01D 43/16
USPC .......................................................... 56/12.7
See application file for complete search history.

(56) References Cited

U.S. PATENT DOCUMENTS

| | | | | | |
|---|---|---|---|---|---|
| 2,603,249 | A | * | 7/1952 | Lawrence | 144/34.1 |
| 2,771,730 | A | * | 11/1956 | True | 56/11.6 |
| 3,668,845 | A | * | 6/1972 | Parker | A01D 43/16 56/11.6 |
| 4,170,099 | A | * | 10/1979 | Owens | 56/16.9 |
| 4,453,372 | A | * | 6/1984 | Remer | A01D 43/16 56/11.6 |
| 4,663,920 | A | * | 5/1987 | Skovhoj | 56/12.7 |
| 4,896,488 | A | * | 1/1990 | Duncan et al. | 56/13.7 |
| 4,901,508 | A | * | 2/1990 | Whatley | 56/10.4 |
| 4,987,731 | A | * | 1/1991 | Cianciulli | A01D 42/02 56/16.7 |
| 5,040,360 | A | * | 8/1991 | Meehleder | 56/11.6 |
| 5,065,566 | A | | 11/1991 | Gates | |
| 5,167,108 | A | * | 12/1992 | Bird | 56/13.7 |
| 5,226,284 | A | * | 7/1993 | Meehleder | 56/11.6 |
| 5,303,532 | A | * | 4/1994 | Phillips | A01D 34/863 56/12.7 |
| 5,367,862 | A | | 11/1994 | Spear et al. | |
| 5,471,824 | A | | 12/1995 | Neely | |

(Continued)

OTHER PUBLICATIONS

DR Trimmer Movwers. DR Power Equipment—Professional Power Done Right. http://www.drpower.com/trimmer-mower_features.aspx.

*Primary Examiner* — Thomas B Will
*Assistant Examiner* — Joan D Misa
(74) *Attorney, Agent, or Firm* — Whiteford, Taylor & Preston, LLP; Gregory M. Stone

(57) ABSTRACT

A trimmer attachment for installation on a lawnmower that includes a floating trimmer head driven by a trimmer drive pulley. The trimmer drive pulley is connected by a belt to a mower trimmer pulley, which is attached to an existing mower blade pulley. The trimmer attachment is easily removed from the lawnmower when not in use or when it is not needed. The lawnmower further includes a foot pedal which allows the user to raise the trimmer attachment when necessary, and a hand lever which can be used to both raise and lower the attachment for purposes of clearing obstacles and operating bump-feed type trimmer head, when installed.

17 Claims, 8 Drawing Sheets

(56) References Cited

U.S. PATENT DOCUMENTS

| | | | |
|---|---|---|---|
| 5,906,051 A | 5/1999 | Nannen | |
| 5,960,614 A * | 10/1999 | Jones | 56/15.2 |
| 6,094,896 A * | 8/2000 | Lane | 56/13.7 |
| 6,345,489 B1 * | 2/2002 | Everts | A01B 51/02 172/245 |
| 6,397,572 B1 * | 6/2002 | Roundy et al. | 56/13.7 |
| 6,415,586 B1 * | 7/2002 | Park | 56/12.7 |
| 6,457,301 B1 * | 10/2002 | Buss | 56/12.7 |
| 6,474,053 B1 | 11/2002 | Lund | |
| 6,487,838 B2 | 12/2002 | Handlin | |
| 6,786,030 B2 | 9/2004 | Nafziger | |
| 6,874,306 B2 | 4/2005 | Hishida | |
| 6,892,518 B1 | 5/2005 | Bares | |
| 6,966,168 B1 * | 11/2005 | Kerr, Sr. | A01D 34/001 56/12.7 |
| 6,971,223 B2 | 12/2005 | Scott et al. | |
| 6,986,238 B1 | 1/2006 | Bloodworth | |
| 7,165,382 B2 * | 1/2007 | Mitchell, Jr. | 56/12.7 |
| 7,302,790 B2 | 12/2007 | Brandon | |
| 7,398,637 B1 * | 7/2008 | Sevey | 56/14.9 |
| 7,690,177 B2 * | 4/2010 | Spitzley | 56/14.9 |
| 7,712,293 B1 * | 5/2010 | Recker | 56/14.9 |
| 7,827,771 B2 | 11/2010 | Hishida | |
| 8,046,980 B1 * | 11/2011 | Schroeck | 56/12.7 |
| 8,302,372 B1 * | 11/2012 | Eubanks | 56/12.7 |
| 2004/0154277 A1 * | 8/2004 | Shumate | 56/12.7 |
| 2004/0237491 A1 | 12/2004 | Heighton et al. | |
| 2005/0193700 A1 | 11/2005 | Bares | |
| 2010/0223897 A1 * | 9/2010 | Mills | 56/12.7 |

* cited by examiner

FLOATING TRIMMER ATTACHMENT FOR LAWNMOWERS

CROSS REFERENCE TO RELATED APPLICATIONS

This application claims priority under 35 U.S.C. §119(e) from U.S. Provisional Application Ser. No. 61/723,954, filed on Nov. 8, 2012, and titled "Floating Trimmer Attachment for Lawnmowers," which is incorporated herein by reference in its entirety.

BACKGROUND OF THE INVENTION

Field of the Invention

This invention relates to lawnmower accessories and, more particularly, to a lawnmower accessory for trimming grass and vegetation when installed on riding or deck lawnmowers.

Description of the Background

Riding lawnmowers are commonly used in both household and commercial settings. Lawnmower blades are manufactured from solid metal, are not flexible, and spin very fast in order to cut grass and other vegetation. As a result, lawnmower blades are typically covered by metal enclosures that prevent the user from harm from the blade directly, or indirectly from debris that the blade pushes away as it turns. The cover of the blades makes it difficult to reach places close to walls or trees. In order to reach these locations, the user typically needs to use a separate piece of equipment such as a handheld trimmer. The need for a separate piece of equipment requires the user to spend a longer amount of time in order to complete the task of mowing a particular tract of land.

Prior attempts at solving this problem comprise the permanent attachment of trimming accessories to lawnmowers as shown, for example, in US Patent Publication Nos. 2005/0193700A1 and 2004/0237491, and in U.S. Pat. Nos. 5,065,566; 5,167,108; 6,474,053; 6,487,838; 6,786,030; and 6,892,518. Others have attempted to solve this problem by placing an attachment for a trimmer to riding lawnmowers, as shown in U.S. Pat. No. 6,986,238. The references cited herein are incorporated by reference in their entirety. The prior art, however, fails to provide a removable trimming attachment that is easy to use, can be easily attached to, and removed from, the mower, and that does not interfere with the normal operation of the lawnmower.

SUMMARY OF THE INVENTION

It is one object of the present invention to provide a removable trimmer attachment for a lawnmower. The trimmer attachment has three primary elements: i) a mounting deck element, ii) a trimmer connecting element, and iii) a trimmer element; where the trimmer connecting element is configured to allow a trimmer to move vertically. The trimmer connecting element is pivotally attached, on one end, to the mounting deck element and, on a second end, to the trimmer element.

Another object of the present invention is to provide a lawnmower configured to accept a removable trimmer attachment. The lawnmower has four primary elements: i) a mounting deck element housing, ii) a mounting deck element, iii) a trimmer connecting element, and iv) a trimmer element; where the trimmer connecting element is configured to allow a trimmer to move vertically. The lawnmower may also include a hand lever, a mower trimmer pulley, and a foot lever for raising and lowering the trimmer attachment.

It is another object of the present invention to provide a kit for retrofitting a lawnmower to install a trimmer attachment described above.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION

The invention summarized above may be better understood by referring to the following description, claims, and accompanying drawings in which corresponding call numbers relate to corresponding parts and elements of embodiments of the invention. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
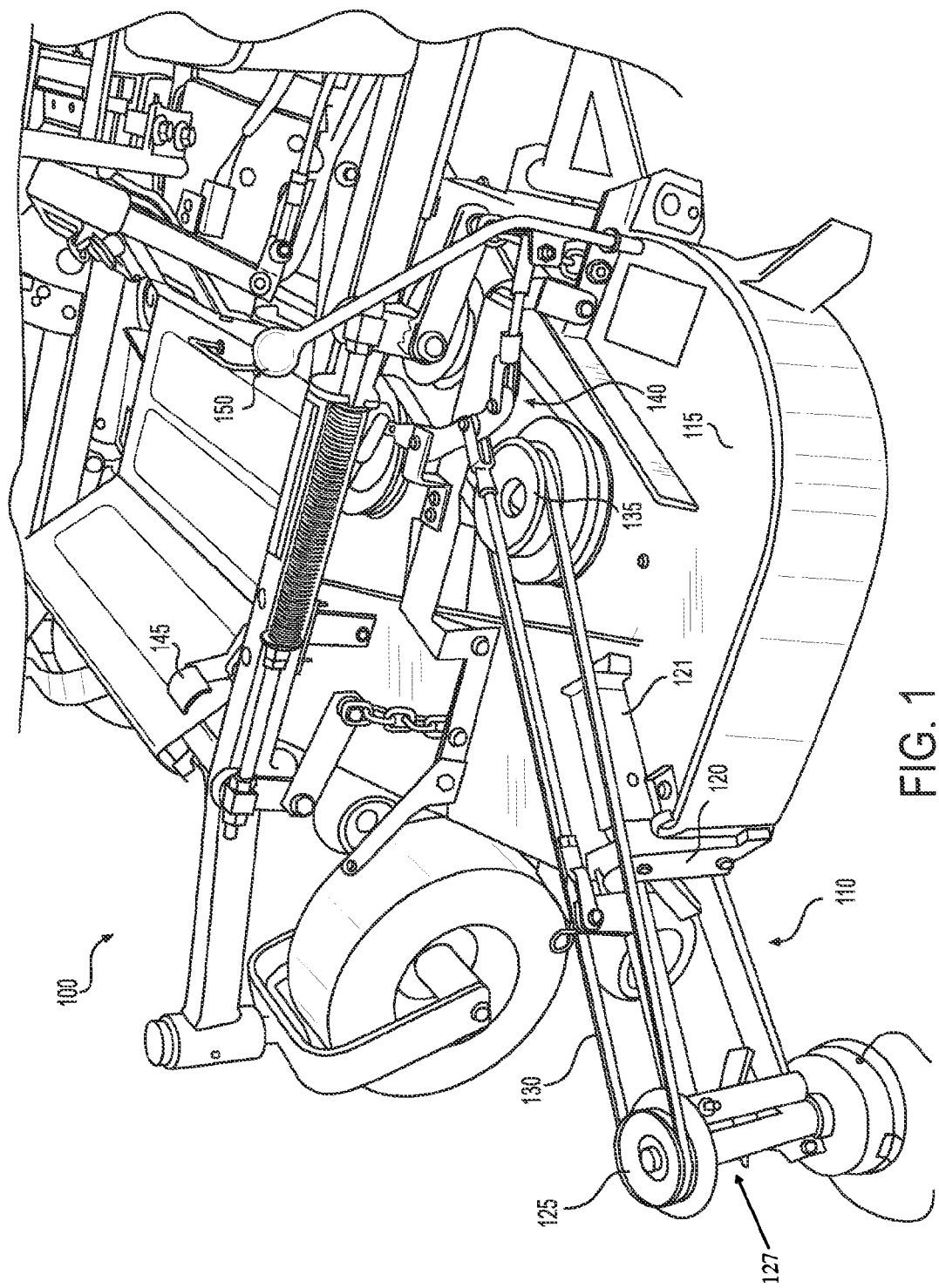
FIG. 1 is a graphical representation of a lawnmower having an engaged detachable floating trimmer assembly in accordance with one embodiment of the present invention.

It is an object of the present invention to provide a lawnmower 100 with a detachable floating trimmer attachment 110 as shown on FIG. 1. The detachable floating trimmer attachment 110 is releasably secured to the deck 115 of the lawnmower 100 through a mounting deck element 120 and mounting deck element housing 121. The trimmer attachment 110 is powered by a belt 130 that connects a trimmer drive pulley 125 to a mower trimmer pulley 135. A person of ordinary skill in the art would understand that other methods of powering the trimmer attachment 110 can be utilized. The trimmer attachment 110 is further connected to a lift mechanism 140. The lift mechanism 140 can be actuated by a foot pedal 145 or a hand lever 150.

Figure 2:
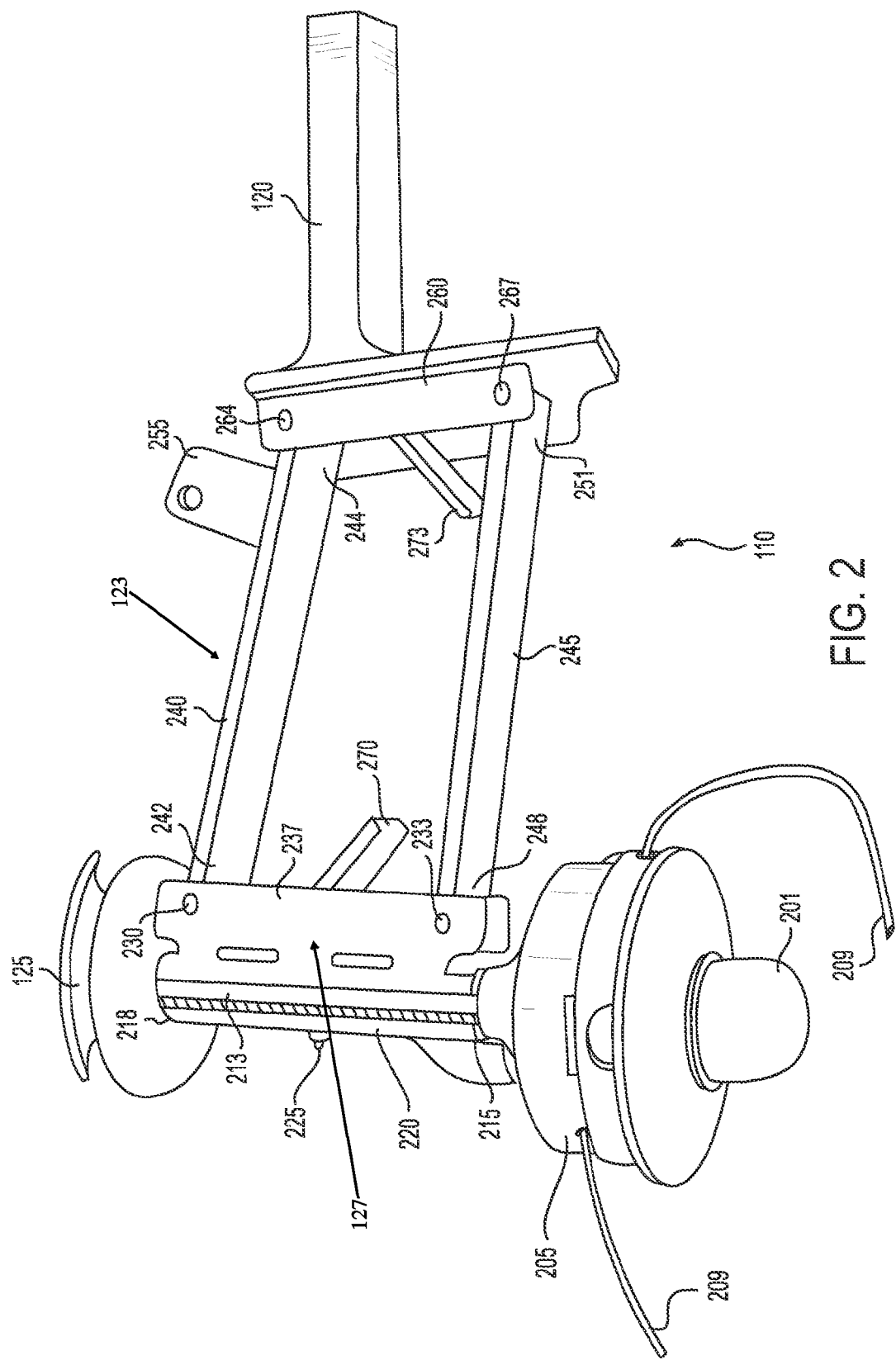
FIG. 2 is a side view of a trimmer attachment in accordance with one embodiment of the present invention.

The trimmer attachment 110, as shown in FIG. 2, comprises three main elements: a mounting deck element 120, a trimmer connecting element 123, and a trimmer element 127.

The trimmer element 127 comprises four main components: a trimmer head 205, a trimmer shaft housing 220, a trimmer shaft 213, and a trimmer drive pulley 125. The trimmer head 205 can be any available commercial head for trimmers or any mechanism known to a person of ordinary skill in the art for use in cutting grass. In one exemplary embodiment, the trimmer head 205 has flexible cutting cords 209 that are used to cut grass and other vegetation when activated by the lawnmower 100, it is contemplated that other types of cutting elements may be utilized. The trimmer head 205 is connected to a trimmer shaft 213. The trimmer shaft 213 has a trimmer head end 215 and a trimmer drive pulley end 218. A guide element 201 is connected to the trimmer head end 215 of the trimmer shaft 213. It is contemplated that the guide element 201 prevents the trimmer head 205 from contacting the ground and facilitates vertical travel of the trimmer attachment 110. The trimmer head 205 is removably connected to the trimmer head end 215 of the trimmer shaft 213. In some embodiments, the guide element 201 also secures the trimmer head 205 to the trimmer shaft 213. The trimmer drive pulley 125 is connected to the trimmer drive pulley end 218 of the trimmer shaft 213.

The trimmer shaft 213 is contained within a trimmer shaft housing 220 that allows the trimmer shaft 213 to rotate freely when torsional force is applied to the trimmer shaft 213 by the trimmer drive pulley 125 or any other driving element. In some embodiments, the trimmer shaft housing 220 has a lubrication point 225. The lubrication point 225 allows a user to pump grease or other lubricants into the trimmer shaft housing 220 between inner wall of the trimmer shaft housing 220 and the outer wall of the trimmer shaft 213. It is contemplated that the trimmer shaft 213 can be made of hollow or solid material that is of sufficient strength to support the torsional force applied by the trimmer drive pulley 125. The lubrication of the trimmer shaft housing 220 reduces friction between the inner wall of the trimmer shaft housing 220 and the outer wall of the trimmer shaft 213. It is contemplated that, in some embodiments, the outer wall of the trimmer shaft 213 and the inner wall of the trimmer shaft housing 220 are coated or made from a low friction or frictionless material, which reduces the need of lubrication for the trimmer attachment 110 and, in such instances, a lubrication point 225 may not be required.

The trimmer shaft housing 220 also includes a top pivoting member 230 and a bottom pivoting member 233. In some embodiments, the top pivoting member 230 and the bottom pivoting member 233 are part of a shaft housing bracket 237 that is welded to the trimmer shaft housing 220. In other embodiments, the top pivoting member 230 and bottom pivoting member 233 are part of the trimmer shaft housing 220, which is manufactured as a single unit with the trimmer shaft housing bracket 237. An upper arm 240 is attached to the top pivoting member 230 of the trimmer shaft housing 220. The upper arm 240 has a first trimmer shaft housing end 242 and a first mounting deck element end 244. The upper arm 240 also comprises a manual link attachment point 255. A lower arm 245 is connected to the bottom pivoting member 233 of the trimmer shaft housing 220. The lower arm 245 has a second trimmer shaft housing end 248 and a second mounting deck element end 251.

The upper arm 240 and lower arm 245 are pivotally attached to the mounting deck element 120, which further comprises an arm connecting element 260. The upper arm 240 is connected to a mounting deck element upper pivoting member 264 and the lower arm 245 is connected to a mounting deck element lower pivoting member 267. As shown in FIG. 2, the arm connecting element 260 is preferably an integral single piece with the mounting deck element.

The trimmer attachment 110, as described above, allows the trimmer head 205 to automatically travel vertically as it moves over irregularities on the terrain such as roots, tree branches, and rocks. When the guide element 201 comes in contact with a terrain irregularity, it causes the trimmer attachment 110 to float upwards. The vertical travel of the trimmer attachment 110 is facilitated by the pivoting connection between the trimmer shaft housing 220 and the mounting deck element 120. In some embodiments, as shown on FIG. 2, vertical travel is limited by vertical travel stops 270 and 273. A trimmer head vertical travel stop 270 extends downwardly away from the shaft housing bracket 237. The trimmer head vertical travel stop 270 prevents the lower arm 245 from traveling upwardly further than a predetermined distance. The distance between the end of the trimmer head vertical travel stop 270 and the lower arm 245 is designed to prevent, for example, the belt 130 from disengaging from the trimmer drive pulley 125. A mounting deck element travel stop 273 extends downwardly away from the connecting element 260 and further assists the trimmer head vertical travel stop 270 in preventing excessive vertical travel.

Figure 3:
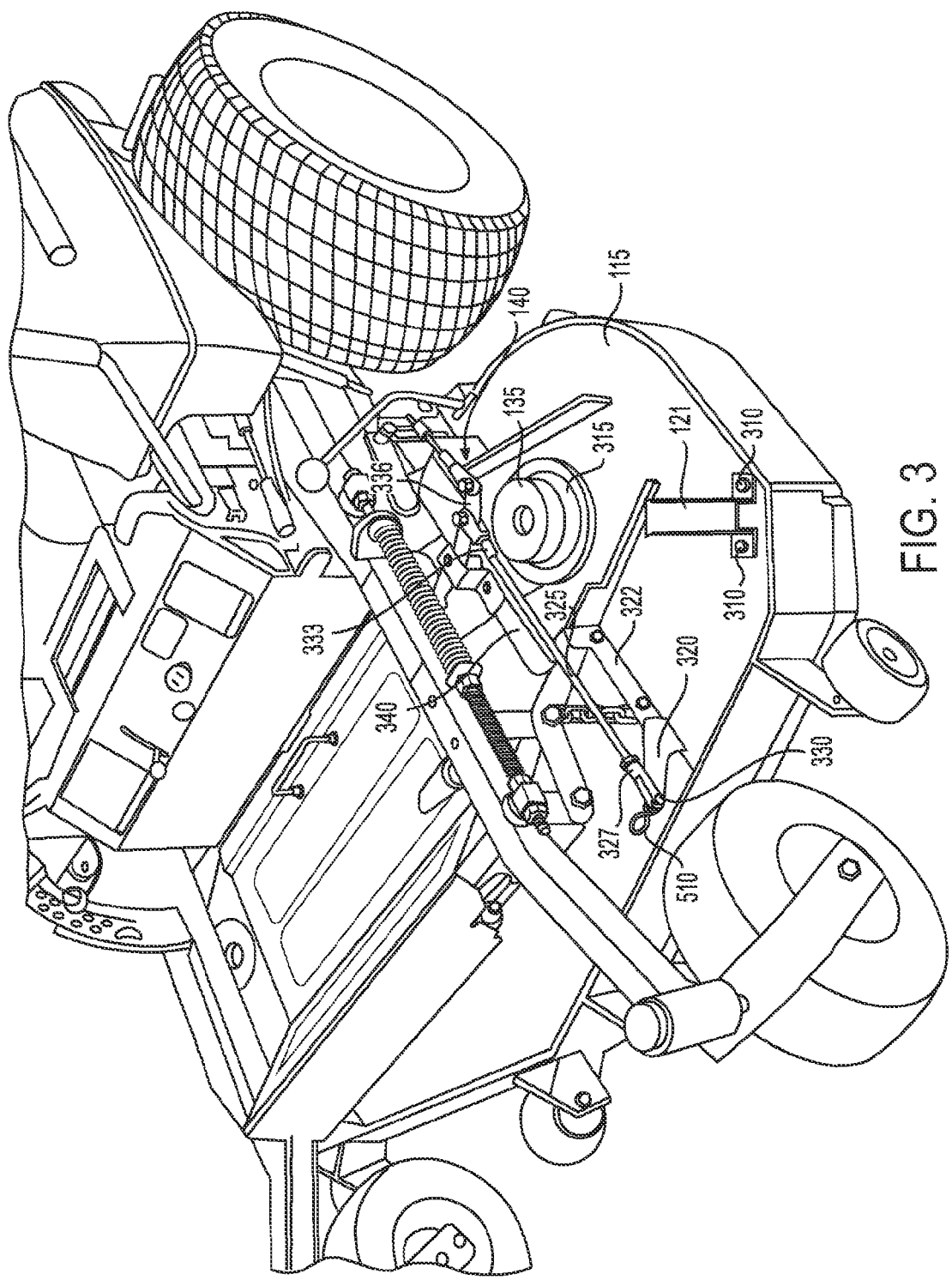
FIG. 3 is a side frontal view of a lawnmower configured to accept a trimmer attachment in accordance with one embodiment of the present invention.

In order to attach the trimmer attachment 110 to the lawnmower 100, the deck 115 is modified as shown on FIG. 3. The mounting deck element housing 121 is configured to accept the mounting deck element 120, and is attached to the top of the deck 115. In some embodiments, the mounting deck element housing 121 is welded to the deck 115. In other embodiments, the mounting deck element housing 121 is secured to the deck 115 by fastening devices such as bolts 310. A mower trimmer pulley 135 is attached to a lawnmower blade pulley 315 or any other driving element as recognized by a person of ordinary skill in the art. Once the trimmer attachment 110 is attached to the mounting deck element housing 121, the belt 130 is installed to connect the trimmer drive pulley 125 to the mower trimmer pulley 135, which is powered by the lawnmower blade pulley 315 or other driving element. It is contemplated that other ways to power the mower trimmer pulley 135 can be utilized as recognized by those skilled in the art.

Figure 4:
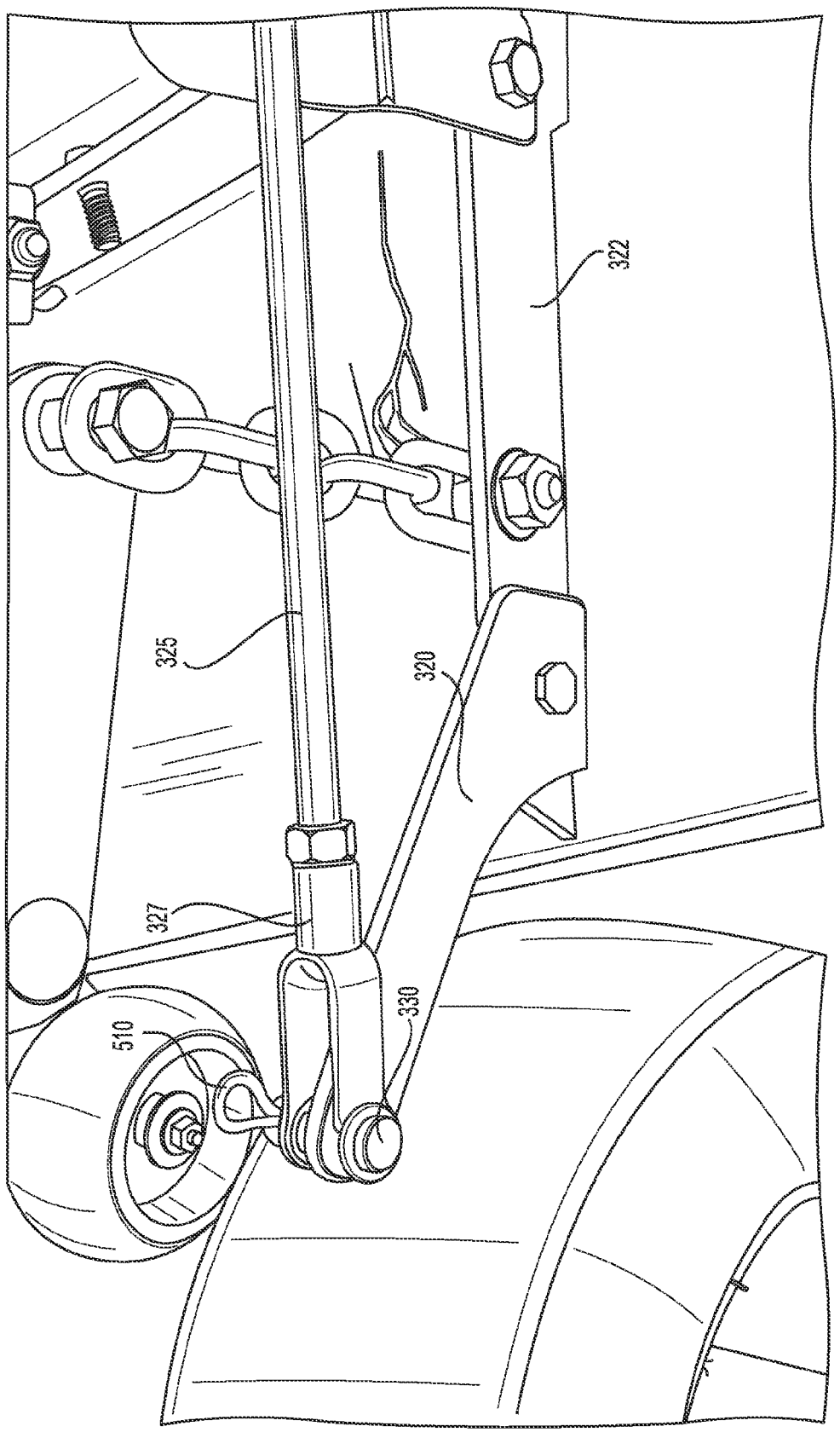
FIG. 4 is close up view of a linking rod storage attachment in accordance with one embodiment of the present invention.
Figure 5:
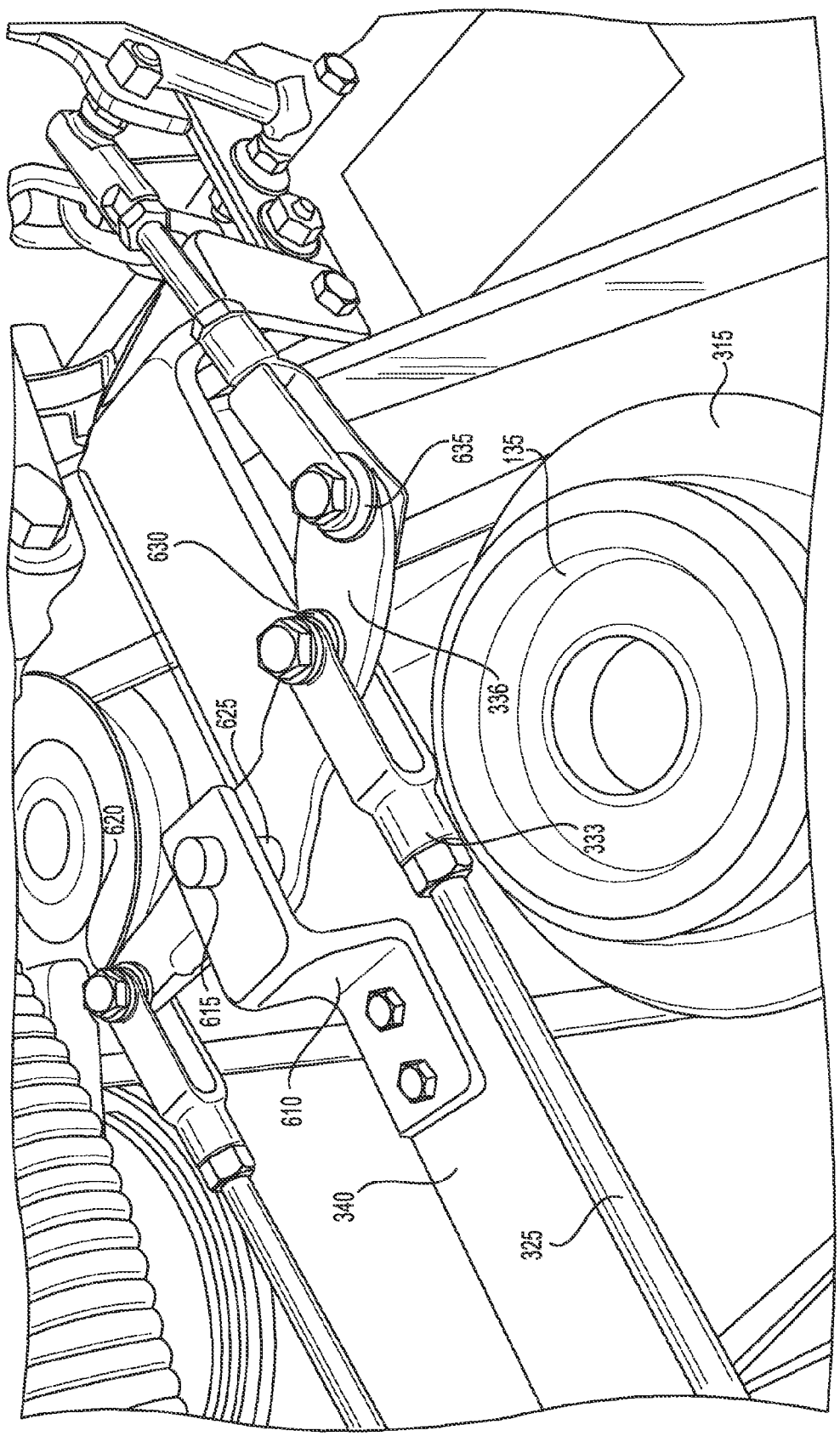
FIG. 5 is a close up view of a swivel linkage in accordance with one embodiment of the present invention.

The mounting deck further comprises a lift mechanism 140 that serves at least two purposes: 1) maintains tension on the belt 130 and 2) allows the user to manually lift the trimmer head 205 to avoid obstacles. The lift mechanism 140 can be attached to existing structures on the deck 115. In one embodiment as shown in FIGS. 3 and 4, a storage attachment 320 is attached to an existing support 322 or directly to the deck 115. The existing support 322 includes any part of the lawnmower deck 115 to which the storage attachment 320 can be connected. The storage attachment 320 is configured to secure a trimmer attachment linking rod 325 when the trimmer attachment 110 is not attached to the deck 115. The trimmer attachment linking rod 325 has a fastening clevis 327 that attaches to the storage attachment 320 when the trimmer attachment 110 is not attached to the deck 115 or to the manual link attachment point 255 on the upper arm 240 of the trimmer attachment 110. In one exemplary embodiment, the fastening clevis 327 is a u-shaped attachment that is configured to accept a fastening pin 330. The fastening pin 330 is configured to accept a fastener 510, such as a hair pin clip, an R-clip, a cotter pin, or other types of fasteners that secure the fastening pin 330 to the storage attachment 320 or the manual link attachment point 255. On the opposite end of the trimmer attachment linking rod 325, as shown on FIG. 5, a linkage fastening clevis 333 connects the trimmer attachment linking rod 325 to a swivel linkage 336.

Figure 7:
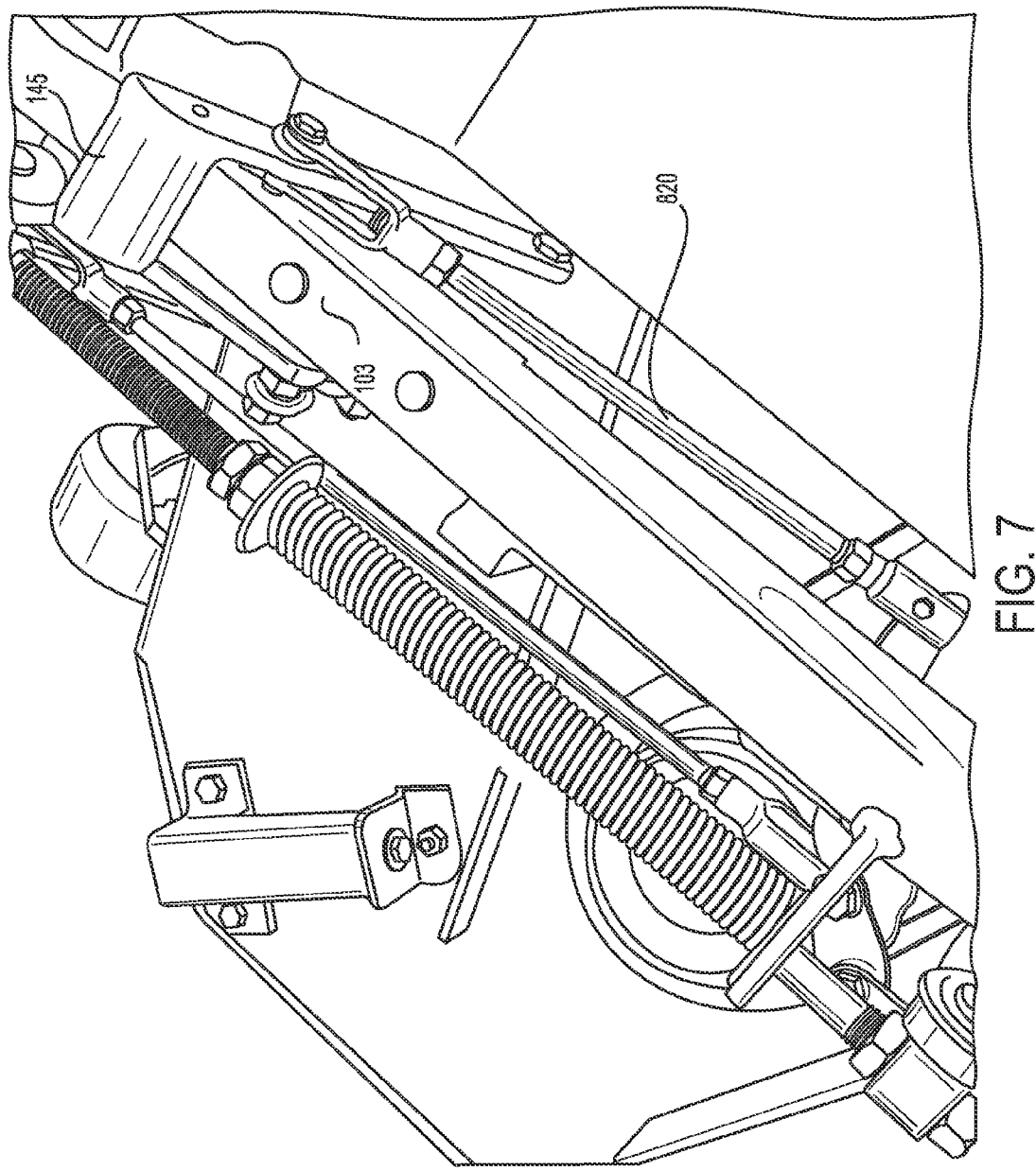
FIG. 7 is a top view of a foot pedal mechanism in accordance with one embodiment of the present invention.
Figure 8:
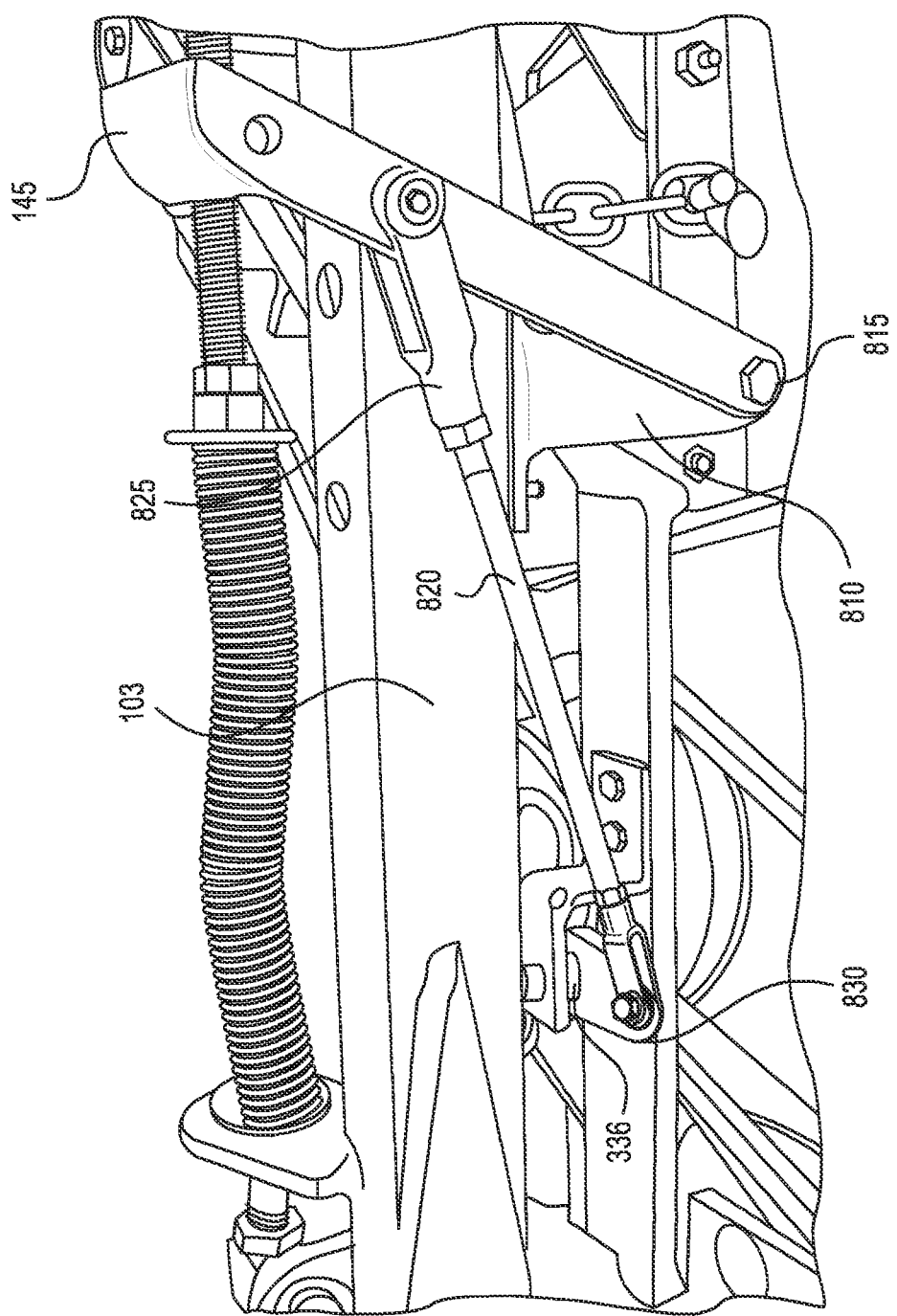
FIG. 8 is a side view of a foot pedal mechanism in accordance with one embodiment of the present invention.

The swivel linkage 336 is connected to a frame element 340. The frame element 340 has a swivel bracket 610 that secures the swivel linkage 336 and allows it to pivot around the axis of a swivel bracket pivot post 615. The swivel linkage 336 has four attachment points. The first attachment point is a pedal control attachment point 620. The pedal control attachment point 620 causes the swivel linkage 336 to rotate counterclockwise when the foot pedal 145, as shown in FIGS. 1, 7, and 8, is pressed forward. The second attachment point, i.e., the swivel bracket attachment point 625, corresponds to the point at which the swivel linkage 336 is connected to the swivel bracket pivot post 615. The third attachment point is the linking arm attachment point 630. The final attachment point is the hand lever attachment point 635.

Figure 6:
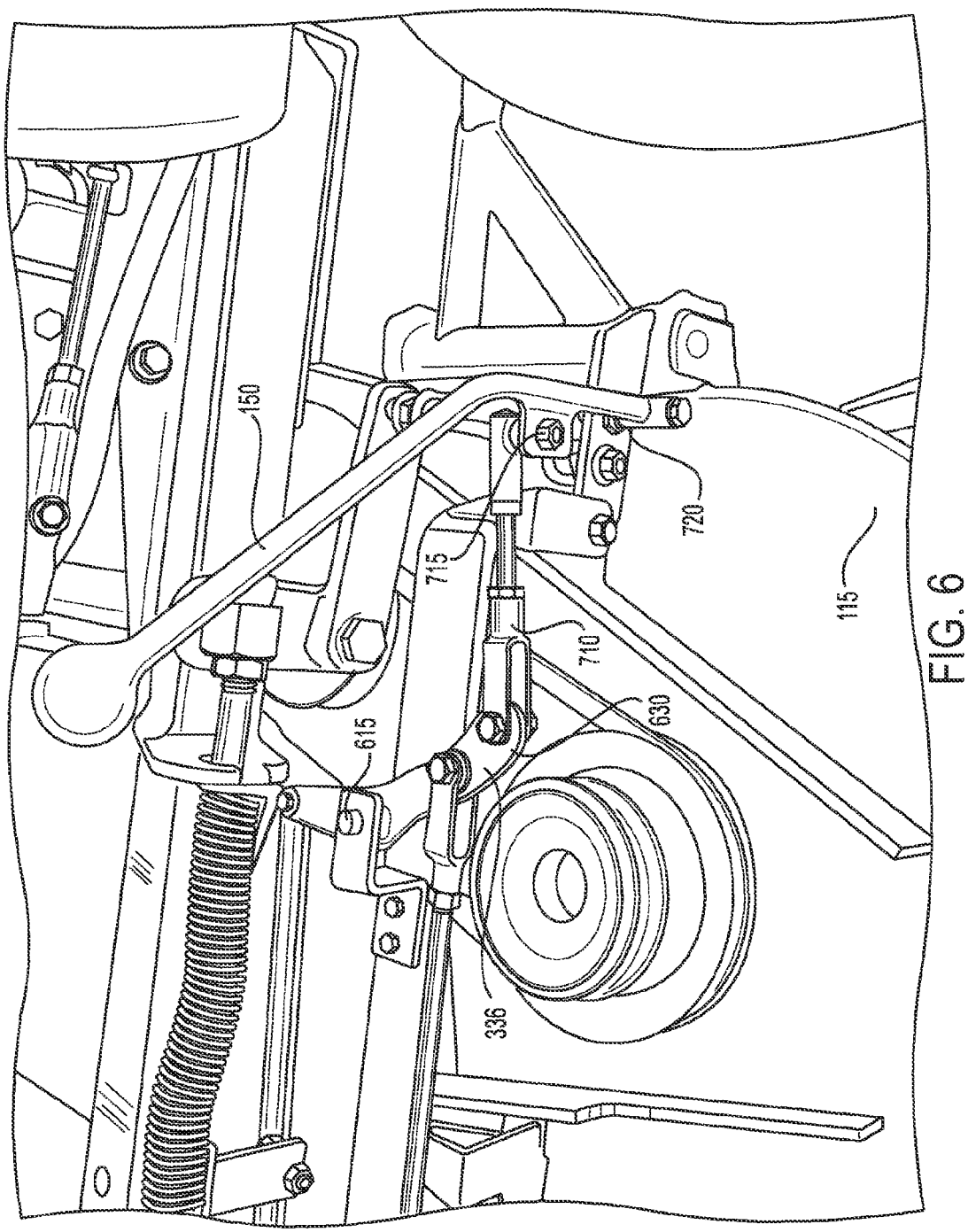
FIG. 6 is a side view of a hand lever installed on a lawnmower in accordance with one embodiment of the present invention.

As shown on FIG. 6, the swivel linkage 336 is connected at the hand lever attachment point 630 to a hand lever connector link 710. The hand lever connector link 710 attaches, on one end, to the swivel linkage 336 and, on the opposite end, to the hand lever 150. The hand lever 150 has one linking attachment point 715 and one frame connecting point 720. The hand lever 150 is connected to the deck 115 by a pivoting element that allows the hand lever 150 to pull the connector link 710 causing the swivel linkage to rotate counterclockwise around the vertical axis of the swivel bracket pivot post 615, which, in turn, causes the trimmer attachment linking rod 325 to be pulled and the trimmer attachment 110 to be raised vertically to avoid obstacles. The hand lever 150 can also be used to push the connector link 710 causing the swivel linkage 336 to rotate clockwise around the vertical axis of the pivot post 615. This in turn causes the trimmer attachment linking rod 325 to be pushed and create downward pressure on the trimming attachment 110, depressing the guide element 201 into the trimmer head 205, thus allowing for advancement of cutting cords 209 when a bump-feed type of trimmer head 205 is employed.

The trimmer attachment 110 can also be raised vertically by actuating the foot pedal 145, as shown in FIGS. 7 and 8. The foot pedal 145 is attached to the lawnmower frame 103 by a pedal attachment bracket 810. The foot pedal 145 is attached to the pedal attachment bracket 810 by a pedal pivot member 815. The pivot member 815 allows the foot pedal 145 to pivot around the pivot member's 815 horizontal axis. The foot pedal 145 is further connected to a foot pedal linking rod 820. The pedal linking rod 820 attaches, on pedal end 825, to the foot pedal 145 and, on swivel end 830, to the swivel linkage 336.

In the first step of the installation of the trimmer attachment 110, the mounting deck element 120 slides into place inside the mounting deck element housing 121. At this point, the trimmer attachment linking arm 325 is securely stowed and locked onto the storage attachment 320. The trimmer shaft housing 220 is then raised vertically and a belt 130 is installed linking the trimmer drive pulley 125 and the mower trimmer pulley 135. Once the trimmer shaft housing 220 is lowered, the slack in the belt 130 is removed, providing sufficient tension to allow the mower trimmer pulley 135 to drive the trimmer drive pulley 125. The trimmer attachment linking rod 325 is then secured to the manual link attachment point 255.

In one further embodiment, an installation kit is disclosed. The installation kit comprises all the components described above to retrofit the trimmer attachment of the present invention on a lawnmower. In an exemplary embodiment the kit comprises a case (not shown), a mounting deck element housing 121, and a trimmer attachment 110. In a further embodiment, the kit includes the components of the lift mechanism 140, such as the foot pedal 145, hand lever 150, trimmer attachment linking rod 325, fastening clevis 327, fastening pin 330, linkage fastening clevis 333, swivel linkage 336, and fasteners 510. In yet other exemplary embodiments, the kit may include different types of trimmer heads 205 as recognized by a person of ordinary skill in the art.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A trimmer attachment, comprising:
   a mounting deck element having an elongate arm configured for horizontal slidable insertion into an elongate, horizontal sleeve-shaped mounting deck element housing positioned on a deck of a mower, and for releasably fixed attachment to said mounting deck element housing, said mounting deck element further comprising an upper pivot connection and a lower pivot connection;
   a trimmer element having a vertical shaft, a trimmer head affixed to a bottom end of said vertical shaft, a trimmer drive pulley affixed to a top end of said vertical shaft, a trimmer element upper pivot connection and a trimmer element lower pivot connection; and
   a trimmer connecting element configured to allow the trimmer element to move vertically such that said vertical shaft remains generally perpendicular to the ground throughout vertical movement of said trimmer element, said trimmer connecting element further comprising:
      an upper arm having an upper arm first end pivotally attached to said trimmer element upper pivot connection and an upper arm second end pivotally attached to said mounting deck element upper pivot connection, and a manual link attachment extending upward from said upper arm; and
      a lower arm having a lower arm first end pivotally attached to said trimmer element lower pivot connection and a lower arm second end pivotally attached to said mounting deck element lower pivot connection;

wherein said trimmer connecting element is configured to cause said trimmer element to automatically move vertically in response to a bottom surface of said trimmer element engaging varying contours of the ground, and to cause said trimmer element to be manually moved vertically in response to engagement of said manual link attachment.

2. The attachment of claim 1, further comprising at least one vertical travel stop positioned to engage a top surface of said lower arm of said trimmer connecting element so as to limit vertical movement of said trimmer element.

3. The attachment of claim 1, said manual link attachment further comprising a manual link pivot connection configured to pivotally receive an end of a manual operation linking rod.

4. The attachment of claim 1, further comprising a drive shaft engaging each of said trimmer drive pulley and said trimmer head, wherein said drive shaft is configured to rotate in said vertical shaft.

5. The attachment of claim 1, said trimmer head further comprising a rounded guide element extending from a bottom surface of said trimmer head and configured to prevent non-planar engagement between said trimmer head and the ground.

6. A lawnmower, comprising:
an elongate, horizontal sleeve-shaped mounting deck element housing attached to a lawnmower deck and forming a hollow sleeve; and
a trimmer attachment, comprising:
a mounting deck element having an elongate arm configured for horizontal slidable insertion into said mounting deck element housing and for releasably fixed attachment to said mounting deck element housing, said mounting deck element further comprising an upper pivot connection and a lower pivot connection;
a trimmer element having a vertical shaft, a trimmer head affixed to a bottom end of said vertical shaft, a trimmer drive pulley affixed to a top end of said vertical shaft, a trimmer element upper pivot connection and a trimmer element lower pivot connection; and
a trimmer connecting element configured to allow the trimmer element to move vertically such that said vertical shaft remains generally perpendicular to the ground throughout vertical movement of said trimmer element, said trimmer connecting element further comprising:
an upper arm having an upper arm first end pivotally attached to said trimmer element upper pivot connection and an upper arm second end pivotally attached to said mounting deck element upper pivot connection, and a manual link attachment extending upward from said upper arm; and
a lower arm having a lower arm first end pivotally attached to said trimmer element lower pivot connection and a lower arm second end pivotally attached to said mounting deck element lower pivot connection;
wherein said trimmer connecting element is configured to cause said trimmer element to automatically move vertically in response to a bottom surface of said trimmer element engaging varying contours of the ground, and to cause said trimmer element to be manually moved vertically in response to engagement of said manual link attachment.

7. The lawnmower of claim 6, further comprising a mower trimmer pulley coaxially aligned with and engaging a blade drive shaft of said mower.

8. The lawnmower of claim 7, further comprising a drive belt connecting said mower trimmer pulley to said trimmer drive pulley on said trimmer element, and configured to drive said trimmer element upon driving of said blade drive shaft, wherein said drive belt is mounted for removal from said mower trimmer pulley and said trimmer drive pulley when said trimmer element is manually vertically raised by lifting said drive belt directly upward from said lawnmower deck.

9. The lawnmower of claim 6, further comprising a manually operable lift mechanism, and a linking rod pivotally attached to said manual link attachment on said upper arm at a first end of said linking rod, and pivotally attached to said lift mechanism at a second end of said linking rod.

10. The lawnmower of claim 9, wherein said lift mechanism further comprises a manually operable foot pedal and a manually operable hand lever, wherein each of said foot pedal and said hand lever are configured to vertically lift said trimmer element upon actuation thereof.

11. The lawnmower of claim 10, said trimmer head further comprising a rounded guide element extending from a bottom surface of said trimmer head and configured to prevent non-planar engagement between said trimmer head and the ground.

12. A kit for retrofitting a lawnmower with a trimmer attachment, comprising:
an elongate, horizontal sleeve-shaped mounting deck element housing forming a hollow sleeve configured for attachment to a top of a lawnmower deck; and
a trimmer attachment, comprising:
a mounting deck element having an elongate arm configured for horizontal slidable insertion into said mounting deck element housing and for releasably fixed attachment to said mounting deck element housing, said mounting deck element further comprising an upper pivot connection and a lower pivot connection;
a trimmer element having a vertical shaft, a trimmer head affixed to a bottom end of said vertical shaft, a trimmer drive pulley affixed to a top end of said vertical shaft, a trimmer element upper pivot connection and a trimmer element lower pivot connection; and
a trimmer connecting element configured to allow the trimmer element to move vertically when said trimmer element is installed on a mower, such that said vertical shaft remains generally perpendicular to the ground throughout vertical movement of said trimmer element, said trimmer connecting element further comprising:
an upper arm having an upper arm first end pivotally attached to said trimmer element upper pivot connection and an upper arm second end pivotally attached to said mounting deck element upper pivot connection, and a manual link attachment extending upward from said upper arm; and
a lower arm having a lower arm first end pivotally attached to said trimmer element lower pivot connection and a lower arm second end pivotally attached to said mounting deck element lower pivot connection;
wherein said trimmer connecting element is configured to cause said trimmer element, when installed on a mower, to automatically move vertically in response to a bottom surface of said trimmer element engaging varying contours of the ground, and to cause said trimmer element to be manually moved vertically in response to engagement of said manual link attachment.

13. The kit of claim 12, further comprising a mower trimmer pulley adapted for coaxial connection to a blade drive shaft of a mower.

14. The kit of claim 12, further comprising a drive belt for connecting said mower trimmer pulley to said trimmer drive pulley on said trimmer element, and configured to drive said trimmer element upon driving of said blade drive shaft, wherein said drive belt is mounted for removal from said mower trimmer pulley and said trimmer drive pulley when said trimmer element is manually vertically raised by lifting said drive belt directly upward from said lawnmower deck.

15. The kit of claim 12, further comprising a manually operable lift mechanism for said trimmer attachment, and a linking rod configured for pivotally attaching to said manual link attachment on said upper arm at a first end of said linking rod, and for pivotally attaching to said lift mechanism at a second end of said linking rod.

16. The kit of claim 15, wherein said lift mechanism further comprises a manually operable foot pedal and a manually operable hand lever, wherein each of said foot pedal and said hand lever are configured to vertically lift said trimmer element upon actuation thereof.

17. The kit of claim 12, said trimmer head further comprising a rounded guide element extending from a bottom surface of said trimmer head and configured to prevent non-planar engagement between said trimmer head and the ground.

* * * * *